US012442361B2

(12) United States Patent
Angel

(10) Patent No.: US 12,442,361 B2
(45) Date of Patent: Oct. 14, 2025

(54) PHOTON DRIVE AND PHOTON TURBINE

(71) Applicant: Blaz Angel, Ljubljana (SI)

(72) Inventor: Blaz Angel, Ljubljana (SI)

( * ) Notice: Subject to any disclaimer, the term of this patent is extended or adjusted under 35 U.S.C. 154(b) by 0 days.

(21) Appl. No.: 18/728,050

(22) PCT Filed: Jul. 29, 2022

(86) PCT No.: PCT/IB2022/057057
§ 371 (c)(1),
(2) Date: Jul. 10, 2024

(87) PCT Pub. No.: WO2023/131826
PCT Pub. Date: Jul. 13, 2023

(65) Prior Publication Data
US 2025/0092864 A1  Mar. 20, 2025

(30) Foreign Application Priority Data
Jan. 10, 2022 (SI) ................... P-202200005

(51) Int. Cl.
*F03H 3/00* (2006.01)
*B64G 1/40* (2006.01)

(52) U.S. Cl.
CPC ............... *F03H 3/00* (2013.01); *B64G 1/417* (2023.08)

(58) Field of Classification Search
None
See application file for complete search history.

(56) References Cited

U.S. PATENT DOCUMENTS

| | | | | |
|---|---|---|---|---|
| 7,413,147 | B2 * | 8/2008 | Bae ...................... | B64G 1/407 244/164 |
| 2007/0045474 | A1 * | 3/2007 | Bae ..................... | B64G 1/1085 244/171.1 |
| 2008/0197238 | A1 | 8/2008 | Bae | |
| 2018/0195499 | A1 * | 7/2018 | Kardos ................. | G02B 26/08 |

OTHER PUBLICATIONS

Thomas M. Randolph, Timothy P McElrath, Steven M. Collins, and David Y. Oh, "Three-Axis Electric Propulsion Attitude Control System with a Dual-Axis Gimbaled Thruster," AIAA 2011-5586, 47th AIAA/ASME/SAE/ASEE Joint Propulsion Conference & Exhibit Jul. 31-Aug. 3, 2011, San Diego, California. (Year: 2011).*
O. Neunzig, M. Weikert , M. Tajmar, "Thrust measurements and evaluation of asymmetric infrared laser resonators for space propulsion," CEAS Space Journal (2022) 14:45-62, Published online: Apr. 24, 2021 © The Author(s) 2021 (Year: 2021).*
Samuel A. Howard, Christopher DellaCorte and Michael J. Dube, "Magnetic Levitation for Long-Life Space Mechanisms: Technology Assessment and Remaining Challenges," NASA/TM-2019-220052, Dec. 2019. (Year: 2019).*
Young K. Bae, "Photonic Laser Thruster: 100 Times Scaling-Up and Propulsion Demonstration," Journal of Propulsion and Power vol. 37, No. 3, May-Jun. 2021. (Year: 2021).*
Young K. Bae, "Photonic Laser Propulsion: Proof-of-Concept Demonstration," Journal of Spacecraft and Rockets vol. 45, No. 1, Jan.-Feb. 2008. (Year: 2008).*
Young K. Bae, "Propellantless Spacecraft Formation-Flying and Maneuvering with Photonic Laser Thrusters," NIAC Symposium 2014. (Year: 2014).*
G. S. Gevorkyana, R. G. Manucharyana, V. M. Mekhitarian, A. M. Razhev, I. M. Ulanov', K. N. Kolmakovc, "Inductive lasers," International Conf. on Lasers, Applications, and Technologies 2005: Advanced Lasers and Systems, Proc. of SPIE vol. 6054, 605400, (2005) • doi: 10.1117/12.660802 (Year: 2006).*
Brito et al., Overview of Theories and Experiments on Electromagnetic Inertia Manipulation Propulsion, AIP Conference Proceedings, vol. 746, Issue 1, Feb. 6, 2005.
Thibado, P. M., et al. "Fluctuation-induced current from freestanding graphene." Physical Review E 102.4 (2020): 042101.
Feynman, R.P.,"The Origin of the Refractive Index", Feynman Lectures on Physics, vol. I, Chapter 31, 1963.
Feynman, R.P., "Inside Dielectrics", Feynman Lectures on Physics, vol. II Chapter 11, 1964.
Feynman, R.P., QED: The Strange Theory of Light and Matter, Oct. 21, 1988.
Jim McClymer, "Reactionless drive with conservation of momentum", arxiv.org, Cornell University Library, 201 Olin Library Cornell University Ithaca, NY 14853,Feb. 14, 2019 (Feb. 14, 2019), XP081121385, pp. 1-5, figure 1.
Masud Mansuripur, "Radiation pressure and the linear momentum of the electromagnetic field", Optics Express,vol. {0} 12, No. {0} 22, Nov. 1, 2004 (Nov. 1, 2004), p. 5375-5401, XP055345116.
Li Zhang et al, "Experimental evidence for Abraham pressure of light", May 22, 2015 (May 22, 2015), vol. {0} 17, No. {0} 5, p. 53035, XP020284099, DOI: 10.1088/1367-2630/17/5/053035.
Mansuripur Masud Ed—Caulfield H John et al, "Solar sails, optical tweezers, and other light-driven machines", Tribute To Joseph W. Goodman, SPIE, 1000 20th St. Bellingham WA 98225-6705 USA,vol. {0} 8122, No. {0} 1, Sep. 8, 2011 (Sep. 8, 2011), p. 1-13, XP060017667 DOI: 10.1117/12.903613.

(Continued)

*Primary Examiner* — David P. Olynick
(74) *Attorney, Agent, or Firm* — Bryant J. Keller; Kirton McConkie

(57) ABSTRACT

Photon drive and photon turbine When light reflects from a mirror it transfers sometimes more and sometimes less momentum to the mirror when mirror has dielectric in front compared to mirror in vacuum. Bouncing focused light between two mirrors fixed in a chasing where in front of one there is dielectric material and in front of the other there is vacuum, creates a net force difference. The second way to produce the force is through drag which light feels when it travels through dielectric material. This drag continuously transfers part of the light's momentum to the material. Net force from bouncing light between two mirrors can be used for linear propulsion in low friction environments such as outer space. When we redirect the light into a circular motion using coiled up fiber optic cable on the outer rim, than light creates rotating motion that can be used for electricity generation.

20 Claims, No Drawings

(56) References Cited

OTHER PUBLICATIONS

Iver Brevik et al, "Remarks on the Abraham-Minkowski problem, from the formal and from the experimental side", arxiv.org, Cornell University Library, 201 Olin Library Cornell University Ithaca, NY 14853, Nov. 13, 2020 (Nov. 13, 2020),XP081908638, DOI: 10.1142/S0217751X21500639 external link.
Levchenko Igor et al, "Prospects and physical mechanisms for photonic space propulsion", Oct. 26, 2018 (Oct. 26, 2018), vol. {0} 12, No. {0} 11, p. 649-657, XP036622970 DOI: 10.1038/S41566-018-0280-7 external link ISSN:1749-4885.
M.G. Millisnasa,Prospects for Breakthrough Propulsion from Physics, May 2004.
International Search Report and Written Opinion for related International Application PCT/IB2022/057057, Jul. 13, 2023.
International Preliminary Report on Patentability for related International Application PCT/IB2022/057057, Apr. 12, 2024.

\* cited by examiner

PHOTON DRIVE AND PHOTON TURBINE

BACKGROUND

Energy generation using lasers and optics. Interaction of light with matter and behavior of light and matter when they are coupled, that is when light travels through transparent material.

There have been a lot of attempts to generate force for propulsion by manipulating electromagnetic waves in different setups. Most notably there was the so called EM drive and the Slepian drive. More on the subject can be found in the paper by M.G. Millis and NASA: Prospects for Breakthrough Propulsion from Physics, May 2004. Similar presentation was prepared by Brito and Elaskar, American Institute of Physics: Overview of Theories and Experiments on Electromagnetic Inertia Manipulation Propulsion, February 2005. As recent as 2017 NASA investigated Mach Effect Thruster. All attempts to this day gave null results and no successful and working prototype has ever been created.

Useful theoretical and experimental background, which is producing intended results, is Photonic Laser Thruster constructed by Y. K. Bae Corp. It harnesses the property of a photon's interaction with mirror that gives us twice the transfer momentum, apparently doubling the energy of a photon from nothing when we bounce a photon between two opposite mirrors. This effectively pushes the mirrors apart. The company claims to achieve more than 1,000 reflections of the same photon, so this is rightfully called recycling of the same photon. The same photon properties but without recycling are used in the concept of solar sail, also called light sail or photon sail.

BRIEF SUMMARY OF THE INVENTION AND RELATED ART

The actual working application that uses properties on quantum level and has no mechanical moving parts, which are two important characteristics of this invention, is power generation from Seebeck effect. However, this effect is highly inefficient and requires significant heat differential in order to create electricity. Therefore, it is economical only in special circumstances. The related subject to this invention is also extraction of useful energy from ambient heat using Brownian motion. The paper from many authors arXiv: Fluctuation-induced current from freestanding graphene: toward nanoscale energy harvesting, Feb. 25, 2020, describes the experiment which turned ambient heat into electricity. Authors proved that the graphene moving due to Brownian motion, creates a flow of charge through the circuit and preforms electric work. This in effect turns useless ambient heat into useful work. Distantly related to the subject and currently without practical use, according to its authors, is warp bubble created by Limitless Space Institute in 2021. Bubble utilizes Casimir effect on the micro scale to create negative energy density distribution that closely matches requirements for the Alcubierre drive, which generates propulsion by warping space and time. The concept is currently only theoretical.

This invention is centered on interaction between electromagnetic waves traveling through transparent media. Such setups were not covered in the above mentioned papers. Current theoretical background on how the electromagnetic waves interact with transparent media is defined in the next two papers prepared by many authors: New Journal of Physics: Experimental evidence for Abraham pressure of light, May 22, 2015 and arXiv: Photon mass drag and the momentum of light in a medium, Jun. 29, 2017. These two papers and many others examine a century old debate between Minkowski and Abraham momentum of light. Both momentums are theoretically derived from more fundamental laws that are all well tested. Although describing the same thing, both momentums are not compatible with each other. Abraham momentum is decreased compared to vacuum momentum of light while Minkowski is increased. It is generally accepted that they are both correct. They can both be measured but the measurements depend on the circumstances of the experimental setup. The attempt to explain them usually includes separating them to the momentum of light, which is lower or Abraham momentum and the momentum of light coupled with matter pressure wave, which is higher or Minkowski momentum. The important finding of these papers for the purpose of this invention therefor is that tiny changes in setup conditions produce radically different results. That is why precise fine tuning is needed and this invention gives the general direction for the setups.

Even more basic theoretical background lies in the understanding of the refraction index of light in transparent material. We have classical electrodynamic and quantum mechanical explanations of this phenomenon. Classical explanation attributes slower speed of light in materials to emergence of additional electric field created by agitated electrons of the material. As presented in the Feynman Lectures on Physics Vol. I Ch. 31: The Origin of the Refractive Index, 1963, the electric field of light accelerates electrons in material that radiate secondary electric field and both fields combined create slower propagating electric field. Formula for the refractive index presented in mentioned lecture shows that the index depends linearly on the density of electrons in the material. We know that glasses can be made out of different combinations of atoms bound to molecules. Atoms contain electrons in different shells and each shell bounds electrons to nucleus in a different way. Not to mention that number of electrons corresponds to number of protons and actual number of neutrons varies from element to element and from isotope to isotope. The strength of the electron bond determines the possible acceleration with which electron responds to light. Therefore it is reasonable to expect that all electrons will not equally respond to the presence of light. Experimentally we know that relationship between glass density and refraction index is linear. The denser the glass, the higher the index. Since the density of the glass and the density of equivalent electrons are not linearly related, the classical explanation based on this formula cannot be correct. There are additional refinements of this formula that encompasses characteristics of each material from dipoles to different types of polarization. None of this additional factors comes from basic laws, on the contrary they are all measured and retrofitted to the equation. Eventually results do not depend on the density of the electrons but on the density of the material as a whole which is presented in Feynman Lectures on Physics Vol. II Ch. 11: Inside Dielectrics, 1964. Electrons do determine the density of material by defining how densely packed nuclei can be, at the same time electrons are not what constitutes density. They are just a proxy for density. Real density comes from nuclei. Density is therefore undoubtedly the only common denominator of refraction index. It is well known and emphasized on many occasions that all classical formulas are just a crude replacement for quantum mechanics. At the same time quantum mechanics does not provide explanations for the behavior of atomic nuclei beyond the hydrogen atom.

If we take a more detailed look at the classical description we see that incoming wave stimulates new emission. And this new radiated wave is out of phase with the incoming wave and therefore the phase is delayed. This new delayed wave replaces the old wave and interacts with the next electron which again delays and replaces the original wave. This opens the question of simultaneity. In order to delay the original wave front the newly radiated wave must appear instantly. Otherwise it cannot catch up the wave front of original wave. Since electron is a particle with mass and only accelerated charges radiate, it is improbable that this simultaneity is satisfied. Nothing with mass can move instantly. Nothing at all can move instantly.

There are also other reasons that cast doubt on the classical explanation. Sometimes this newly radiated out of phase wave is represented as a counter balancing electric field. An electric field has a direction and the direction of the incoming electric field is altered by adding to it the direction of the new electric filed induced in the material. This process is supposedly responsible for the bending of the light when it enters the material. Since electric field has a direction and electrons radiate a counter balancing electric field than the bending of light would depend on the relation between polarization of incoming light and the incoming angle. Which it does not. It is independent of the polarization with some exceptional materials such as Iceland spar.

Additionally we know from photo electric effect onwards that light is quantized, which means that there is no partial agitation of charged particles. Either there is interaction between photon and charged particle or there is not. We know from double slit experiment that any interaction with a photon collapses its wave function and we do not observe the interference pattern. This means that light passing through material, with which it interacts since it is slowed down, should obey different laws than light passing through vacuum. However there is only one working wave function for both cases and therefor it is hard to accept that there is any interaction between light and electrons in transparent material.

Furthermore classical explanation claims that light is absorbed by electrons that are excited but cannot reach higher stable orbits and therefore reemit the light almost instantly. This process supposedly causes the delay of light, but since light travels in straight lines this means that electrons are always arranged in straight lines and have the same spacing between them in order to assure the constant and consistent slowing of light. This is clearly not the case and not only constant time delay but also radiation of light in a straight line present problems for this concept. Nevertheless, such processes are happening when we have bound electrons in atom as it is the case for air molecules. But in this case light scatters. Therefore this is not the process that happens in solid transparent materials.

When we on the other hand have free electrons the classical theory also claims that incoming photons accelerate those electrons and create regional charge imbalances by densely grouping the charges. When electric repulsion restores equilibrium charge balance this also accelerates charges. All this acceleration is supposedly the cause of radiation of new waves. Such is the case of reflection of AM radio waves from free electrons in the stratosphere. The problem with this concept is that restoring charge balance is a gradual process and incoming radio waves have high frequency compared to speeds of moving free electrons which are diluted in the upper atmosphere. To expect that electrons would restore charge balance so fast as to allow the continuous radio signal which exactly reflects back to earth is not reasonable. If electrons were the main cause of reflection than the radio signal would be more scattered and not a useful radio wave.

Not only with reflection, the quantum explanation also has trouble with transmission of light by the material. Explanation argues that photon as a wave travels at light speed, but due to interactions with matter it follows multiple paths. Shortest paths destructively interfere, while longer paths constructively interfere and create light with apparently slower speed. This is a major obstacle for quantum explanation since it is hard to believe that matter will always be structured in such a way as to give photons exactly the same paths that would constructively interfere. Using this explanation we would expect that apparently similar glasses would give a wide range of refractive indexes due to their internal atomic structures. But they don't.

In quantum explanation photons scatter of electrons and can go back and forward in material multiple times. Scattering is sometimes understood as absorbed and reemitted photon and this explanations sometimes include the delay from absorption and sometimes don't. Using this model each interaction changes the path of the light wave, scattering it in all directions, but it does not change its phase evolution in the form of a continuous wave function. The continuous phase evolution together with time delay from absorption are an internal contradiction of the quantum theory. In case of absorption and reemission we would expect the interruption in phase evolution; but this is not the case because only continuous phase evolution gives us the agreement between theory and experiment. Continuous phase evolution model also has its own problems since according to it, each reflection contributes to the final result, although it is obvious that reflections arrive at detector at different times. But this is well confirmed in interference experiments when single photon travels by two paths one of which is significantly longer, yet photon still interferes by itself. Therefore it is generally accepted that light goes by many paths and at different speeds which all combined only look like one straight path at light speed. This view is not limited only to light in solid materials but also applies to mirrors and therefore covers also light propagation in vacuum. Such view is in clear contradiction to well established facts that light travels in straight lines and always at light speed in vacuum.

Or we could just accept that quantum mechanics is only a mathematical model and that the model which includes photon absorption by electron is closer to reality and initial photon agitates two or more neighboring electrons and is absorbed in this process. This view says that, all that light does is to go straight at light speed in vacuum and word vacuum encompasses also empty spaces between particles of matter. Two electrons emit two new photons that combine in a new, but slower, photon due to longer path. Or it is slower due to absorption and emission. While this concept is better than a concept of light travelling from one electron to another it still has limitations. Concept of one photon agitating more electrons is problematic. Moreover, using this absorption model we get light that could never completely regain light speed after exiting the glass, since its path would always be slightly longer because it is made from constructive interference from two or more sources. Such sources are always further away from any point in the future than the midpoint between these sources is. The midpoint and the point in the future is the shortest path. Every other path is longer and at least some of the light exiting the glass would travel this longer path. This is not observed since light fully regains light speed once it exits the glass. The second problem is classical Young's interference pattern. It is hard to construct an interference pattern where there would be only one constructive interference in the middle and all the rest would be destructive interferences. The task to create such a pattern with each and every transparent material and all wavelengths of visible light is even harder. If interference is the process that slows the light in glass this would result in the glass blurring the picture, which it does not.

There is also a mixture of quantum and classical explanation. According to that view the photons are waves when they freely propagate. They are not quantized and fill all the space. But at the point of absorption the transfer of the energy from the field to the matter is quantized. The same is true for emission. It holds that particles that make up matter are discrete and therefore we can see the electromagnetic field only through this specific individual particles. The fact is that we can only go as low as a single electron being agitated by the electromagnetic field. But this by itself does not prove that photons are not quantized when they propagate. If they were not quantized and all we had was a continuous field, then we would observe interference patterns from two independent sources. This would be true even if sources produced different wave lengths. Since this is not the case the electromagnetic field is also quantized and photons always propagate as quanta of energy.

Some explanations add to the concept that single photons always travel at the speed of light, but beam of photons travels at the slower speed. In this case the beam are the photons that enter the material as a beam. This explanation comes with the concept of absorption and it is usually explained that photons that came latter stimulate the re-emission of absorbed photon in the same direction that the beam has. Without that, so the explanation goes, the reemission would have random direction. While the process of stimulated emission gives us lasers, it must be said that lasers are monochromatic light. Laser creation process destroys information carried by individual photons, which is not the observed case with glass. In glass each photon maintains its characteristics. If stimulated emission was the case, the pictures we saw through the glass would be blurred. Additionally we can do experiments with single photons which are always delayed. Furthermore the experiment tells us that when shining a light through a block of glass the reflection probability of the photon from the surface of this glass depends on the position of both surfaces of glass and therefore on the thickness of the glass which means that each single photon knows about both surfaces even if it reflects from the front. This makes the explanation of the stimulated emissions hard to accept.

Even more challenging is interference between many photons in a beam of visible light. It is generally theoretically accepted that photons do not interact with other photons, although we have experiments that claim to achieve just that. At the same time these experiments are hard to construct and three photon interference was measured only recently, that is in 2017, therefore it is unlikely that nature would do this on a regular basis. We face similar problem with the explanation that particles emit new photons. Here again we have the problem of multiple photon interference and the fact that these new photons cannot catch up with the original photons that created them. Since we can detect single photons we would see some of this original photons still travel at the speed of light through material while majority would be delayed because they interfered with other photons in the beam that came after the initial photon. But we do not see this results in experiments. Experiments always tell us that what is true for a single photon must also be true for a beam of light and with all this in mind all current explanations face serious challenges. Therefore the modern science fails to provide a consistent, complete and credible understanding of light.

For the purpose of utilizing of this invention, a correct but simplified theoretical explanation of the properties of light in dielectric material is presented in the following text.

When it comes to light reflections even R. Feynman pushed his path integral formulation beyond the limit of its applicability. The quote from his book: QED: The Strange Theory of Light and Matter, Oct. 21, 1988, says that partial reflection of light from front and back surface of glass is just a simplification. Light, as Feynman continues, is really not affected by surfaces. An incoming photon is scattered by the electrons in the atoms inside the glass, and a new photon comes back up to the detector. It's interesting, that instead of adding up all the billions of tiny arrows that represent the amplitude for all the electrons inside the glass to scatter an incoming photon, we can just add two arrows—for the "front surface" and "back surface" reflections—and come out with the same answer, Feynman concludes. While it is possible that the positions of all the billions of electrons are such that produce the same result as they do from two surfaces, this situation is highly improbable. The fact is that two surfaces are the real thing and the infinite paths produced by billions of electrons do not contribute much. You can always theoretically place particles in a material in such a way that they produce intended result. But it is highly unlikely that all the particles will be on the right places all the time. At the same time the experimental results are the same each time we run the experiment. The experiments tell us that surfaces matter.

Therefore the process of AM radio waves reflection in the upper atmosphere is the same as mirage when we see an image of the sky on the hot asphalt road. It is generally accepted that free electrons are not involved in creation of mirage. The same should hold for reflection of AM radio waves from the layers in the upper atmosphere. Boundaries between the layers of air mater as much as the density difference between layers.

Relationship between dielectric's density and refraction index is linear. Density of atomic nuclei is linearly related to density of material and therefore determines observed refraction index. Electrons act only as an on and off switch. Either they absorb and reflect the light or they let it through. If material is structured in such a way, that electrons let the light through, than electrons play only minor role in further interaction. Only in some specific cases electrons in transparent materials absorb the light and reemit it, but generally this is not the case. The main interaction of the electromagnetic wave in transparent material is therefore with atomic nuclei.

Assuming that there is no absorption of light in material than there is no effective electric field either. What we actually have when light travels through transparent media is decoupling of electric and magnetic fields of light with only something resembling a magnetic field remaining. There are some differences of this new field to classical magnetic field. This new field exerts the force on matter in the direction of the motion of the light. On the other hand light fells this force as a drag. The nuclei feel this force more strongly than electrons since force is not dependent on the charge of the particle but on its mass. In case of electrons that are moving relative to the nuclei, the force is sometimes accelerating them and sometimes decelerating them.

In one of the above mentioned papers we see that water when illuminated by laser starts to move. In case water does not have conditions to move since the force is too weak compared to friction, than water bulges upwards as if there is elevated pressure in the part illuminated by laser. There are some effects from absorption by electrons. There is also the effect from reflection which is the property of different distribution of matter on the surface than in the interior. But the major influence comes from the fact that atomic nuclei and electrons feel the electromagnetic wave differently. This difference makes molecules less symmetric and increases overall volume since they cannot pack that closely together than before. The result is the observe bulge in shallow water. Although water is not rigid at the same time forces are small enough that water does not start to flow internally.

If light is able to set the water in motion then initial impact with its large momentum transfer plays an important role. Once light travels in water it tries to speed up and it is constantly slowed down by water. This secondary impacts also transfer energy but due to lower speed this transfer is much smaller than at the surface. However this secondary impacts present a continuous momentum transfer. Light accelerates gradually and is stopped before it can gain significant momentum. Therefore this small transfer still exists. All this creates directed pressure to water or any other dielectric.

As in classical magnetic interaction which does not change the energy of a moving charge but only changes its direction of motion, we can look at this interaction in a similar way. Interaction of light and matter can be seen as redistribution of random motion of matter into directed motion. Therefore interaction transforms thermal energy into kinetic energy and by doing so it changes useless energy into useful one. If we use this energy than the material is effectively cooled in the process and consequently it regains the energy from the surroundings. The process is effective even in cases where surroundings have the temperature of the cosmic microwave background.

This explanation does not address all the difficulties that current theories have, since complete theoretical explanation is not the purpose of this document. This only gives better understanding which helps to utilize the real nature of light for practical applications.

Technical problem to be solved is propulsion in outer space where we are limited by the amount of fuel. First you have to lift the fuel out of earth's gravity and through its thick atmosphere. Secondly by having more fuel on the ship, you have less acceleration due to higher mass. Lowering the amount of fuel by some sort of recycling the same energy or even eliminating the need to carry any fuel by the ship is therefore a problem worth solving.

The solutions of the problem of Propulsion in outer space can, if it is efficient enough, through additional technical additions, eventually lead to energy generation. By transforming the linear acceleration into a circular one, you can make a turbine, which can power classical electrical generators.

Far field freely propagating electromagnetic wave usually of light around the visible range (sometimes in this text referred to as light), displays two different behaviors when it enters a transparent dielectric media. In one case it gains momentum (so called Minkowski momentum) and in another it losses it (so called Abraham momentum). Although these momenta are not correct representation of reality, they do describe behavior in general. It seems that conditions are almost similar, yet the light behaves in a different way. Small imperfections make the same light beam even switch between two momenta which prevents a consistent net force from emerging. That is why fine tuning will be needed for a working prototype.

DETAILED DESCRIPTION OF THE INVENTION

The essence of this invention is to use either increase or decrease of momentum of light to create useful work either by net gain of energy (energy generation) or just useful work with more efficient usage of energy (propulsion system).

We have the following setup. Two mirrors facing each other. In front of one mirror there is transparent dielectric material. In front of the other there is vacuum therefore the mirror is only highly reflective surface without any protective coating. To make useful work we direct the light through a transparent dielectric material with a mirror on the back, so that light would either transfer more or less momentum than in vacuum. The reflected light would hit the mirror with vacuum in front of it on the other side and repeat the process as many times as technically possible. Mirrors are both fixed in the same casing and in this way it would create a net force in one direction. This is the basis of a propulsion system in outer space where even small force compounds with time.

Depending on how we create the most efficient differential, we can also use this concept to mount many such setups to the outer edge of a wheel and get a rotating motion that can run the electric generator. This would be possible if solid transparent dielectrics will be efficient. But if we have to use water or other fluid transparent dielectrics, than centrifugal forces will prevent the normal function. Water acts as an absorber and disperser of excess momentum of light. It does this through circulation and releases this excess energy through friction in all directions. This is why fluids will do a good job in a linear propulsion system where there are low accelerations of the whole system, but not in a rotating one which has centrifugal forces.

The other possible setup utilizes the characteristics of transparent dielectric material to absorb part of the momentum from light. When electromagnetic wave enters transparent dielectric media it starts to interact with the whole media. There is some interaction with the surface and also with the body of media through absorption, but the majority of interactions happen in the media through new force. Electromagnetic wave in a media travels with the speed lower than the speed of light. The wave tries to regain faster speed all the time. Which is clearly visible at the point when the wave exits the media. But since it is obstructed by mass in the media it constantly encounters drag. Through this drag light transfers its momentum to the medium and redirects the momentum of the medium. This is new force. The medium starts to move in the direction of light. The movement of atoms is all in the same direction and therefore it creates useful work if we have solid transparent material. In case the material is fluid than usually the created motion is useless and it is eventually dispersed through vibrating molecules as useless heat in all directions which cancel out the forces. Such setup is still useful in some conditions since it lowers the momentum of light in one direction and thus creating a net force difference as described in one of the above paragraphs.

The drag transfers very low amounts of momentum. Therefore photons have to be recycled using mirrors to have a noticeable and useful impact. Since each photon makes first and last impact measures have to be taken in order to avoid the crowding of this impacts on any particular side. One possible solution is that photons are injected simultaneously from both sides into the system.

If one leg of the journey is in transparent dielectric material and the other in vacuum, than we need additional mirrors in order to make the turn. In this case the higher momentum transfer in the material has to outweigh the higher absorption since we have more of the material in the way, and higher absorption due to two additional mirrors. Since there is some force transfer when light exits the denser material and this force is at 90 degrees to the desired net force direction, the use of two equal setups placed so that they mirror each other and that this two 90 degrees forces cancel.

In case of a rotating turbine there is no need for the vacuum part of the journey of the electromagnetic wave if we have a coiled up transparent dielectric material such as fiber optic cable.

We can use dielectric material such as fiber optic cable for propulsion also in a way that it is not rolled up in a circle but in an elongated shape and consisting of materials with different refraction indexes. One leg has a higher index than the other. In such a way the photons are bound to the material through the process of internal reflection. We lose the large force transfer from the bounces from mirrors since these forces are now redistributed more evenly through internal drag. We get many internal reflections with undesired force directions in such setup, but their forces cancel each other. With that we gain the possibility of longer use of the same photon which creates a net difference force from the drag inside different materials.

Many optimizations can be made. Fine tuning of setups is needed in order to have the same behavior all the time and not to have sometimes Abrahams and sometimes Minkowski momentums in the system.

For Photon Drive the most promising source of electromagnetic waves is laser of wavelengths around visible light. But there can also be other electromagnetic waves such as microwaves. The final setup depends on the reflectiveness of waves on the mirrors and their low absorption into the media they travel through. These two properties must be optimized in order to increase recycling of photons or their longevity. When light transitions between materials we use anti reflective coating. Different polarizations of light can be used to determine optimal solution. With Faraday Effect polarizations can be change many times for the same photon. Incoming angles of light and curvatures of mirrors can also be adjusted. Length of the light pulse must be fine-tuned in order to avoid the crowding of photons that would increase absorption and undesirable switching between different momentums. Refraction of the transparent dielectric media has to be considered. High refraction increases momentum transfer but usually comes at the cost of higher absorption. Low absorption is imperative and so is low mass of the transparent dielectric media. If it is used as linear propulsion than the mass of the engine is very important and efficient recycling is needed.

In case electromagnetic waves are not visible light, than the term mirror is an object that most efficiently reflects that wave length. Additional emphasis must be put into confinement of photons in the system if we use longer wavelengths. Also setups can be made in different configurations. Either there is one continuous transparent dielectric media or there can be separations.

To achieve the optimal relationship and therefore highest output, lower temperatures of materials can be applied. This is especially convenient for thrust engine since it operates in space where low temperatures are easily achievable and maintained.

Even if we do not have a net energy gain and the thrust engine is less efficient than for example and ion thruster of the same gross energy consumption, there is still an advantage. Photon engine does not need to carry any fuel. All the fuel can be transported on the fly as the vessel travels. Using initially placed large mirrors, lenses and lasers to redirect the light through the path that needs to be travelled repeatedly by space crafts. Natural sources of light can also be used.

Even if the vessel has the source of light only behind it and none in front of it, it can use this source for acceleration and deceleration relative to the source. If the system is fixed to the chassis of the vessel this is achieved by changing the direction of light in propulsion system. Either it enters the dialectic media first and then returns through vacuum or the other way around. Instead of the changed direction of the light we can move the whole system, which is fixed in a gimbal, so that it can move in all three special directions. System is in the same position as spinning wheel is in a gyroscope. Gimbal is equipped with motors that can move the system in desired direction.

At the end the safety and reliability issues have to be emphasized. Since there is no explosive propellant on board this is incomparably safer than anything we have up to date. And furthermore many small engines can be joined to make the whole engine and each of them is completely independent of all others. It goes without saying that this increases safety and reliability to before unseen levels. And finally there are no moving parts which makes such engine economical on the long run due to low maintenance.

In Photon Turbine the rotor or the turbine that drives the electric generator must be placed in a low friction regime such as magnetic levitation to counter gravity and in vacuum to eliminate air friction. The energy supplied to the rotor in order to produce photons and the energy harnessed from the rotation must be done using magnetic induction.

For the turbine we have two general concepts. Either a set of linear photon drives mounted on the outer rim of the rotor that drive the rotor in a circular motion. The second option is the coil of fiber optic cable. Photons in the cable can be recycled or the cable is so long that most of the photons are absorbed before the end of the cable.

Contrary to the photon drive here the concept is economical only if the energy supplied to the system which is predominantly in form of photons from a laser, is much lower than electrical energy generated by the system.

The same adjustment and different setups as in photon drive apply also to photon turbine. High internal reflection is important and the incoming angle must be adjusted accordingly if we have a setup with optical cable. There are some other important differences between photon drive and photon turbine. Only solid transparent materials can be used since liquid are subject to centrifugal forces that would not efficiently redistribute the momentum. Turbine should also operate in near vacuum to minimize friction. The mass of the media and the whole system should be minimized in order to additionally reduce friction loses. Even with magnetically levitated turbines there is friction and therefore placing the setup in weightless environment such as an orbit of the planet is also an option. The main goal is to achieve net positive output and if levitation friction prevents this, the orbit is the only option. In order to achieve steadier rotation a more massive setup is beneficial. Therefore, the fiber optic coil can be so long that photons are mostly absorbed before they reach the end since transition from the end to the beginning of the coil means absorption losses. Although the remaining photons at the end can be reinserted at the begging using directional coupler and with that slightly reducing needed input intensity. The final setup must be tested since recycling and therefore shorter fiber optic cable with less overall weight might be more efficient. The size of the rotor and consequently the curvature of the outer ring will strongly influence the retention rate of photons in the system. Prevention of the leaking of photons is mandatory in order to achieve efficient operation. Different densities of the fiber optic cable through its cross section can help to minimize photon losses because photons curve back to the center before they reach the outer surface. Depending on how beneficial are lower temperatures of the system we can adjust how fast the heat exchange with the general environment is facilitated in order to maximize efficiency. Either we will ensure high insulation or add features to stimulate heat transfer.

The invention claimed is:

1. A thrust engine for a space vessel, comprising:
a photon drive configured to be mounted to a chassis of the space vessel, the photon drive comprising:
 a casing having a vacuum formed therein;
 a first mirror disposed within the casing, the first mirror comprising:
  a first reflective surface that is highly reflective to freely propagating electromagnetic waves, the freely propagating electromagnetic waves comprising electromagnetic waves in a visible spectrum of light; and
  a liquid dielectric material in contact with the first reflective surface, the liquid dielectric material being transparent to the freely propagating electromagnetic waves; and
 a second mirror disposed within the casing, the second mirror comprising a second reflective surface that is highly reflective to the freely propagating electromagnetic waves,
 wherein a portion of the second reflective surface lacks any protective coating such that the portion of the second reflective surface is directly exposed to the vacuum,
 wherein the photon drive is configured to receive the freely propagating electromagnetic waves from a source and inject the freely propagating electromagnetic waves into the casing such that the freely propagating electromagnetic waves are reflected between the first mirror and the second mirror multiple times, passing through the liquid dielectric material when reflecting off the first mirror, but reflecting off the second mirror while in the vacuum, thereby contributing to a net thrust force for the space vessel.

2. The photon drive in accordance with claim 1, wherein the first mirror and the second mirror are fixed within the casing in a manner such that they face each other directly, thereby allowing the freely propagating electromagnetic waves to reflect off the first mirror and the second mirror in a straight path.

3. The photon drive in accordance with claim 1, wherein the first mirror and the second mirror are fixed a set distance apart from each other.

4. The photon drive in accordance with claim 1, further comprising a third mirror and a fourth mirror, wherein the freely propagating electromagnetic waves are configured to reflect off the third mirror and the fourth mirror between reflecting off the first mirror and reflecting off the second mirror.

5. The photon drive in accordance with claim 4, wherein a path of the freely propagating electromagnetic waves between the first mirror and the third mirror comprises a first leg of a journey of light, a path of the freely propagating electromagnetic waves between the third mirror and the fourth mirror comprises a second leg of the journey of light, and a path of the freely propagating electromagnetic waves between the fourth mirror and the second mirror comprises a third leg of the journey of light, and wherein the liquid dielectric material is disposed along an entirety of one of the first leg of the journey of light, the second leg of the journey of light, and the third leg of the journey of light.

6. The photon drive in accordance with claim 5, wherein the vacuum takes up an entirety of one of the first leg of the journey of light, the second leg of the journey of light, and the third leg of the journey of light.

7. The photon drive in accordance with claim 1, wherein the photon drive is configured to allow injection of the freely propagating electromagnetic waves into the casing from a first side of the casing and from a second side of the casing.

8. The photon drive in accordance with claim 1, further comprising a gimbal configured to allow the casing to rotate such that the electromagnetic waves can be received from the source and redirected to a desired direction of thrust regardless of where the source is oriented in 3D space.

9. A thrust engine for a space vessel, comprising:
a photon drive configured to be mounted to a chassis of the space vessel, the photon drive comprising:
 a casing having first side, a second side, and a vacuum formed in the casing;
 a first mirror disposed within the casing on the first side, the first mirror comprising:
  a first reflective surface that is highly reflective to freely propagating electromagnetic waves, the freely propagating electromagnetic waves comprising electromagnetic waves in a visible spectrum of light; and
  a dielectric material in contact with the first reflective surface, the dielectric material being transparent to the freely propagating electromagnetic waves; and
 a second mirror disposed within the casing on the second side, the second mirror comprising a second reflective surface that is highly reflective to the freely propagating electromagnetic waves, wherein a portion of the second reflective surface lacks any protective coating such that the portion of the second reflective surface is directly exposed to the vacuum,
 wherein the photon drive is configured to receive the freely propagating electromagnetic waves from a first source and from a second source and inject the freely propagating electromagnetic waves from the first source into the casing from the first side, and inject the freely propagating electromagnetic waves from the second source into the casing from the second side, such that the freely propagating electromagnetic waves from each of the first source and the second source are reflected between the first mirror and the second mirror multiple times, passing through the dielectric material when reflecting off the first mirror, but reflecting off the second mirror while in the vacuum, thereby contributing to a net thrust force for the space vessel.

10. The photon drive in accordance with claim 9, wherein the first mirror and the second mirror are fixed within the casing in a manner such that they face each other directly, thereby allowing the freely propagating electromagnetic waves to reflect off the first mirror and the second mirror in a straight path.

11. The photon drive in accordance with claim 9, further comprising a gimbal configured to allow the casing to rotate such that the electromagnetic waves can be received from at least one of the first source and the second source and redirected to a desired direction of thrust regardless of where the at least one of the first source and the second source is oriented in 3D space.

12. The photon drive in accordance with claim 11, wherein a direction of acceleration can be altered by adjusting a position of the casing using the gimbal.

13. The photon drive in accordance with claim 9, wherein a direction of thrust is configured to be reversed by reversing a direction of the freely propagating electromagnetic waves in the casing.

14. The photon drive in accordance with claim 9, wherein the photon drive is configured to allow injection of the freely propagating electromagnetic waves into the casing from a first side of the casing and from a second side of the casing.

15. The photon drive in accordance with claim 9, wherein the dielectric material comprises a liquid dielectric material.

16. A thrust engine for a space vessel, comprising:
    a photon drive configured to be mounted to a chassis of the space vessel, the photon drive comprising:
        a casing having a vacuum formed therein, the casing being fixed within a gimbal;
        a first mirror disposed within the casing, the first mirror comprising:
            a first reflective surface that is highly reflective to freely propagating electromagnetic waves, the freely propagating electromagnetic waves comprising electromagnetic waves in a visible spectrum of light; and
            a dielectric material in contact with the first reflective surface, the dielectric material being transparent to the freely propagating electromagnetic waves; and
        a second mirror disposed within the casing, the second mirror comprising a second reflective surface that is highly reflective to the freely propagating electromagnetic waves,
    wherein a portion of the second reflective surface lacks any protective coating such that the portion of the second reflective surface is directly exposed to the vacuum,
    wherein the photon drive is configured to receive the freely propagating electromagnetic waves from a source and inject the freely propagating electromagnetic waves into the casing such that the freely propagating electromagnetic waves are reflected between the first mirror and the second mirror multiple times, passing through the dielectric material when reflecting off the first mirror, but reflecting off the second mirror while in the vacuum, thereby contributing to a net thrust force for the space vessel, and wherein the gimbal is configured to allow the casing to rotate such that the electromagnetic waves can be received from the source and redirected to a desired direction of thrust regardless of where the source is oriented in 3D space.

17. The photon drive in accordance with claim 16, wherein the photon drive is in a low friction and low temperature environment.

18. The photon drive in accordance with claim 16, wherein the dielectric material comprises a liquid dielectric material, and wherein the photon drive is configured to allow injection of the freely propagating electromagnetic waves into the casing from a first side of the casing and from a second side of the casing.

19. The photon drive in accordance with claim 16, further comprising a third mirror and a fourth mirror, wherein the freely propagating electromagnetic waves are configured to reflect off the third mirror and the fourth mirror between reflecting off the first mirror and reflecting off the second mirror.

20. The photon drive in accordance with claim 19, wherein a path of the freely propagating electromagnetic waves between the first mirror and the third mirror comprises a first leg of a journey of light, a path of the freely propagating electromagnetic waves between the third mirror and the fourth mirror comprises a second leg of the journey of light, and a path of the freely propagating electromagnetic waves between the fourth mirror and the second mirror comprises a third leg of the journey of light, and wherein the dielectric material is disposed along an entirety of one of the first leg of the journey of light, the second leg of the journey of light, and the third leg of the journey of light.

\* \* \* \* \*